United States Patent Office 3,310,608
Patented Mar. 21, 1967

3,310,608
POLYOXYMETHYLENE COMPOSITIONS CONTAINING ETHYLENE/VINYL ESTER COPOLYMERS
Kanji Matsubayashi, Kenichi Tanabe, and Osamu Fukushima, Kurashiki, Japan, assignors to Kurashiki Rayon Company Limited, Kurashiki, Japan, a corporation of Japan
No Drawing. Filed May 29, 1962, Ser. No. 198,480
Claims priority, application Japan, June 10, 1961, 36/20,580
11 Claims. (Cl. 260—897)

The present invention relates to a method of manufacturing synthetic fibers and other shaped articles of polyoxymethylene characterized in that a melt of mixture consisting of high molecular weight polyoxymethylene and a polymer, or copolymer, or saponified product, or derivative thereof, of organic acid vinyl esters having melting point lower than 250° C., is spun or molded.

The principal object of the invention is to produce easily and at a lower cost synthetic fibers and shaped articles of polyoxymethylene having the same mechanical properties as the synthetic fibers and other shaped articles of heretofore known polyoxymethylene and moreover having improved dyeability and transparency.

The shaped articles, particularly fibers, of high molecular weight polyoxymethylene have excellent dimensional stability, high tenacity and high elasticity. However their transparency and dyeability are too poor to be used commercially, though they can be obtained at low cost.

It has been found that the mixture of high molecular weight polyoxymethylene and vinyl ester polymer described above can be melt-spun or molded, because of their good miscibility, and fibers, films and other shaped articles manufactured from said mixture are remarkably improved in transparency and dyeability to disperse dye and other various kinds of dyestuff without lowering desirable properties such as tenacity, elasticity and dimensional stability of high molecular weight polyoxymethylene.

Further it has been proved that the improvement in the dyeability becomes more remarkable and at the same time the thermal stability of polyoxymethylene can also be improved by using suitable derivatives, such as nitrogen containing derivative of organic acid polyvinyl esters or copolymers of organic acid vinyl esters, such as urethanization product due to the reaction of urea and polyvinyl alcohol, partially saponified polyvinyl acetate, polyvinyl formal, ethylenevinyl alcohol copolymer, or carbamoyl ethylated product due to the reaction with acrylamide, or amino acetalized product due to the reaction with aminoaldehyde.

The reason why such remarkable effects could be found by the invention is not yet sufficiently clear but it may be considered that the combination of polymers, copolymer, or saponified product or derivative thereof of organic acid vinyl esters with polyoxymethylene is specially effective and this is due to the fact that they have mutually moldable effect for a certain extent, thereby properly adjusting the crystallization of polyoxymethylene. The quantity of organic acid vinyl ester polymers to be added with polyoxymethylene may be suitably selected, yet 2 to 90% by weight of the total polymers are preferable and at less than 2% the remarkable improvement in the dyeability and transparency cannot be expected, while at above 90% hot water resistance becomes poor, more particularly, the use as synthetic fibers is considerably limited. Thus, 5 to 60% is most desirable range and within the range synthetic fibers or other shaped articles having mechanical properties similar to those of the heretofore known synthetic fibers or other shaped articles of polyoxymethylene and moreover, having remarkably improved transparency and dyeability as well as thermal stability can be easily prepared.

The effects obtainable by the invention will be explained more clearly by means of some examples. Polyoxymethylene diacetate and a mixture of it with formalized product of copolymerized saponified product of ethylene vinyl acetate (15 mol percent ethylene, 50 mol percent formal) were melt-spun respectively and further heat stretched. The properties of thus obtained samples are shown in Table 1, which clearly shows that the samples B and C of the invention have excellent dyeability and transparency.

TABLE 1

| Sample | Polyoxymethylene diacetate (percent) | Saponified formalized product of ethylene vinyl acetate copolymer (percent) | Tenacity (g./d.) | Elongation (percent) | Dry heat softening temperature [1] (° C.) | Transparency | Dyed quantity [2] | Shrinkage (percent) in water at 100° C. |
|---|---|---|---|---|---|---|---|---|
| (A) | 100 | 0 | 6.2 | 27 | 163 | Bad | 3 | 2 |
| (B) | 90 | 10 | 5.9 | 29 | 160 | Good | 14 | 3 |
| (C) | 70 | 30 | 5.3 | 31 | 165 | ___do___ | 27 | 3 |

[1] 10% shrinkage temperature.
[2] Quantity of dyestuff in mg./1 g. filament when dyed with 3% Diacelliton Fast Brilliant Blue-BF (C.I. Disperse Blue 3) at 95° C. for two hours.

The mixing of these polymers is carried out mechanically using powders, or further kneaded together by using a hot roller or an extruder, or they may be mixed by such means that either one or both of these polymers are dissolved and mixed in a solvent, such as cresol, dimethylformamide or benzyl alcohol and then the solvent may be removed by such means as reprecipitation or evaporation. The spinning is usually effected by extruding the melt of a mixture of these polymers melted usually at a temperature above 150° C. and below 350° C. in a vapor, such as air or nitrogen through spinnerets. So-called semi-melt spinning may be carried out by adding a small amount of solvent or plasticizer for both of these polymers and the molding can be effected by a conventional process, such as extrusion molding, injection molding, or hot press. After the spinning or molding, if necessary, it may be subjected to stretching or heat-set treatment at a temperature above room temperature and below the melting point.

According to the invention, high molecular weight polyoxymethylene having at least 10,000 molecular weight may be used and more particularly, it is preferable to use such polyoxymethylene which has been improved in its thermal stability by esterification, etherification or urethanization of hydroxyl group at the end.

As organic acid vinyl esters use is made of vinyl acetate, vinyl formate, vinyl propionate, vinyl butyrate, vinyl laurate, vinyl stearate, vinyl oleate, vinyl benzoate, vinyl monochloroacetate, isopropenyl acetate, allyl acetate.

As copolymers thereof use is made of copolymers of these organic acid vinyl esters with each other or with ethylene, propylene, vinyl chloride, vinylidene chloride, styrene, methyl acrylate, acrylonitrile, methacrylonitrile, N-vinylpyrrolidone, acrylamide, methacrylamide, methyl methacrylate, ethyl methacrylate, methylvinyl ketone, allylchloride, 2- or 4-vinyl pyridine, 2-methyl-5-vinyl pyridine, 5-ethyl-2-vinyl pyridine, allyl amine, allyl cyclohexyl amine, diethylaminoethyl methacrylate, acrylic acid, methacrylic acid, allylsulfonic acid, vinylsulfonic acid, p-styrenesulfonic acid or salts thereof. By partially or completely saponifying the above substances with an alkali or an acid the saponified substances can be obtained. As derivatives, acetalized products by means of aldehydes, such as formaldehyde, acetaldehyde, propionaldehyde, butyraldehyde, nonylaldehyde, chloroacetaldehyde, benzaldehyde, O- or p-chlorobenzaldehyde, naphthaldehyde, α - aminoacetaldehyde, α - dimethylaminoacetaldehyde, β-aminopropionaldehyde, β-aminobutyraldehyde, β-cyclohexylaminobutyraldehyde, β-dimethylaminobutyraldehyde, dimethylaminopivaldehyde, diethylaminopivaldehyde, cyanoacetaldehyde, acetylaminoacetaldehyde, N-acetyl-N-cyclohexylaminobutyraldehyde, α-sulfoacetaldehyde, β-sulfobutyraldehyde; esterified products with organic acids such as formic acid and acetic acid; etherified products with acrylonitrile, acrylamide, ethylene oxide, propylene oxide, epichlorohydrin, 1-diethylamino-2,3-epoxypropane, β-propiolactone, ethyleneimine, vinylsulfonic acid; and urethanized products with phenyl isocyanate, phenyl urea and urea may be used, and such polymers having melting point lower than 250° C. are desirable.

The invention will be explained further in detail by means of examples.

*Example 1*

Ethylene-vinyl acetate copolymer (15.1 mol percent ethylene) was saponified in methanol containing caustic soda of ⅓ equivalent to vinyl acetate and then acetalized in an aqueous solution containing 100 mol percent (based on vinyl alcohol) of formaldehyde and 15% sulfuric acid at 70° C. for 2 hours, then the degree of formalization was 49.6 mol percent. 10 g. of the formalization product thus obtained and 90 g. of polyoxymethylene diacetate (having intrinsic viscosity of 1.7 dl./g. and 60° C. in chlorophenol containing 2% of α-pinene) are mixed and dissolved in dimethylformamide, and then poured into water to precipitate the mixed polymer and after drying it was charged into an extruder having 11 mm. inner dia. and while melting at 200° C. it was extruded into air through a spinneret having 10 holes each 0.3 mm. dia. and the filaments were wound up at a speed of 250 m./min. and stretched for 350% at 130° C. The filament thus obtained is as shown by sample B in Table 1 having considerably improved dyeability and transparency if compared with the sample A (polyoxymethylene alone).

*Example 2*

In Example 1, 30 g. of saponified formalization product of ethylene vinyl acetate copolymer and 70 g. of polyoxymethylene diacetate were used and similarly treated, then the sample is as shown in Table 1, sample C having splendid transparency and particularly excellent dyeability.

*Example 3*

A mixed solution containing 5% of polyvinyl alcohol having degree of polymerization 1,700, 100 mol percent of formaldehyde and 10 mol percent of β-aminobutyraldehyde dimethyl acetal and 5% of sulfuric acid were agitated for 2 hours at 70° C. and after the formed precipitate was washed with water, it was boiled in dilute ammonia water to eliminate the combined sulfuric acid, then it showed the degree of formalization of 67 mol percent and the degree of amino acetalization of 6 mol percent. The product was mixed with polyoxymethylene diacetate same as in Example 1 at the ratio of 25:75 and sufficiently pulverized to a size less than 30 meshes. This material was clamped between hot plates at 180° C. and pressed under the pressure of 39 kg./cm.², then substantially transparent film was obtained. This film had better thermal stability compared with the film made of polyoxymethylene alone and it was dyed with 4% acid dye, acid brilliant scarlet 3R (C.I. Acid Red 78) 2% sulfuric acid (based on the film) at 90° C. for 2 hours and showed clear dense color. On the contrary, the film made of polyoxymethylene alone could not be dyed at all.

*Example 4*

Instead of the mixed acetalization product of formaldehyde and amino aldehyde in Example 3, formalized polyvinyl alcohol having degree of formalization of 65 mol percent was used and subjected to the similar treatment, then the film was obtained which can be dyed densely with dispersion and direct dyestuffs.

*Example 5*

Instead of saponified formalization product of ethylene-vinyl acetate copolymer in Example 1, ethylene-vinyl acetate copolymer containing 50 mol percent ethylene was used and the filament having good dyeability and transparency was obtained.

*Example 6*

Instead of saponified formalization product of ethylene-vinyl acetate copolymer in Example 2, polyvinyl formate was used and the filament having excellent dyeability was obtained.

*Example 7*

Instead of saponified formalization product of ethylene-vinyl acetate copolymer in Example 2, ethylene-vinyl alcohol copolymer containing 21.5 mol percent of ethylene was used and filament having excellent dyeability was obtained.

*Example 8*

A mixture of 40 g. of benzalized polyvinyl alcohol having the degree of benzalization of 59 mol percent and 60 g. of polyoxymethylene dimethyl ether was hot pressed at 200° C., then the film which is transparent and dyeable with dispersion dye was obtained.

What we claim is:

1. A method of manufacturing shaped articles of improved transparency which comprises mixing (1) high molecular weight polyoxymethylene having a molecular weight of at least 10,000 and (2) a polymer having a melting point below 250° C. selected from the group consisting of ethylene-vinyl acetate copolymers, the saponification products thereof, and formalized saponification products thereof, to form a mixture, and extruding said mixture to form said shaped articles therefrom.

2. A method as defined in claim 1, wherein said shaped articles are fibers.

3. A method as defined in claim 1, wherein said shaped articles are films.

4. A method as defined in claim 1, wherein said polymer comprises 2 to 90% of said mixture.

5. A method as defined in claim 1, wherein said polymer is an ethylene-vinyl acetate copolymer.

6. A composition of matter of improved transparency consisting essentially of (1) high molecular weight polyoxymethylene having a molecular weight of at least 10,000 and (2) 2 to 90% of a polymer having a melting point below 250° C. selected from the group consisting of ethylene vinyl acetate copolymers, the saponification products thereof, and formalized saponification products thereof.

7. A shaped article of improved transparency consisting essentially of a blend of (1) high molecular weight polyoxymethylene having a molecular weight of at least 10,000 and (2) 2 to 90% of a polymer having a melting point below 250° C. selected from the group consisting of ethylene vinyl acetate copolymers, the saponification products thereof, and formalized saponification products thereof.

8. Fibers of improved transparency consisting essentially of a blend of (1) high molecular weight polyoxymethylene having a molecular weight of at least 10,000 and (2) 2 to 90% of a polymer having a melting point below 250° C. selected from the group consisting of ethylene vinyl acetate copolymers, the saponification products threeof, and formalized saponification products thereof.

9. A film of improved transparency consisting essentially of a blend of (1) high molecular weight polyoxymethylene having a molecular weight of at least 10,000 and (2) 2 to 90% of a polymer having a melting point below 250° C. selected from the group consisting of ethylene vinyl acetate copolymers, the saponification products thereof, and formalized saponification products thereof.

10. Fibers as defined in claim 8, wherein said polymer is an ethylene-vinyl acetate copolymer.

11. A shaped article as defined in claim 7, wherein said polymer is an ethylene-vinyl acetate copolymer.

References Cited by the Examiner

UNITED STATES PATENTS

| | | | |
|---|---|---|---|
| 1,985,993 | 1/1935 | Herrmann et al. | 260—874 |
| 3,219,727 | 11/1965 | Kray et al. | 260—874 |
| 3,226,455 | 12/1965 | Matsubayashi et al. | 260—897 |

MURRAY TILLMAN, *Primary Examiner.*

T. G. FIELD, J. W. SANNER, *Assistant Examiners.*